Sept. 17, 1940.　　C. M. SIMMONS ET AL　　2,215,364
ROTARY CULTIVATOR
Filed June 9, 1939　　2 Sheets-Sheet 1
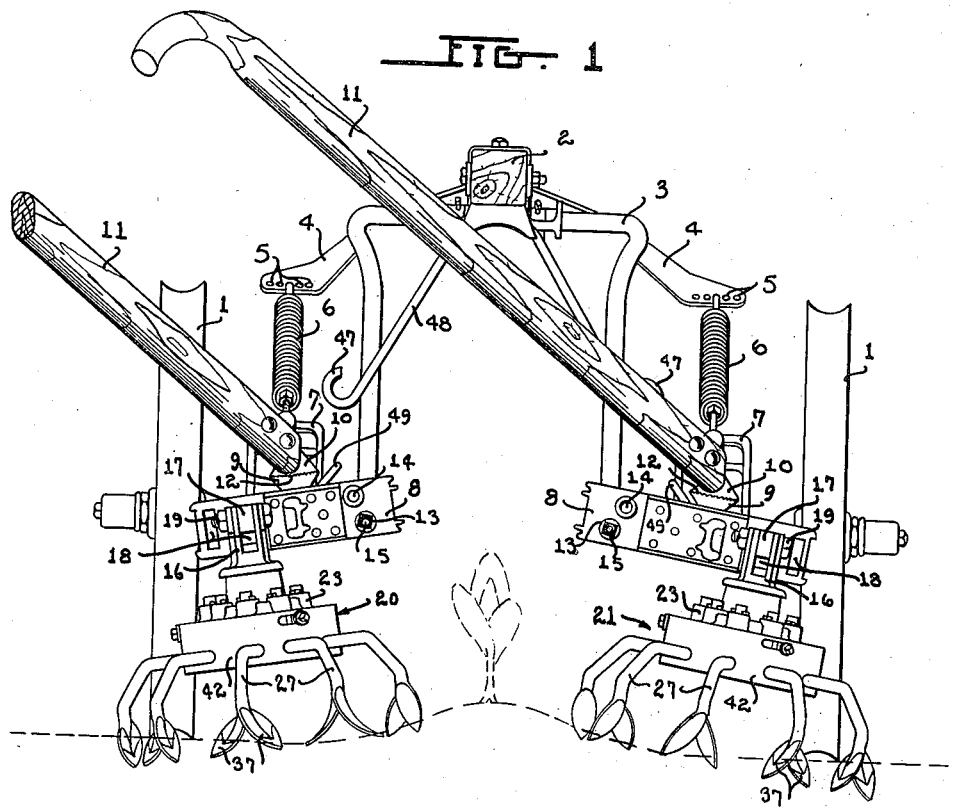
Inventors
CHARLES M. SIMMONS
ERNST E. ENGLUND
Toulmin & Toulmin
Attorneys Sept. 17, 1940.　　　C. M. SIMMONS ET AL　　　2,215,364
ROTARY CULTIVATOR
Filed June 9, 1939　　　2 Sheets-Sheet 2
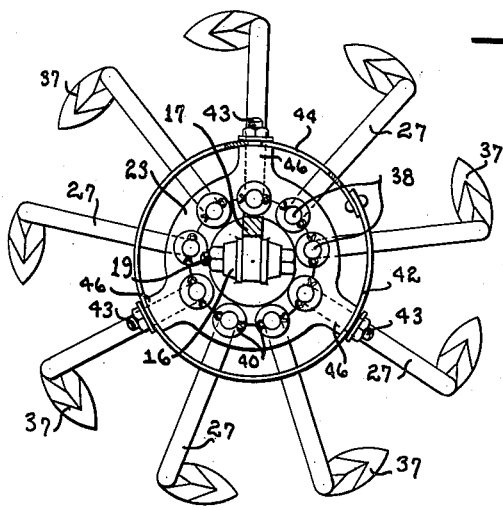
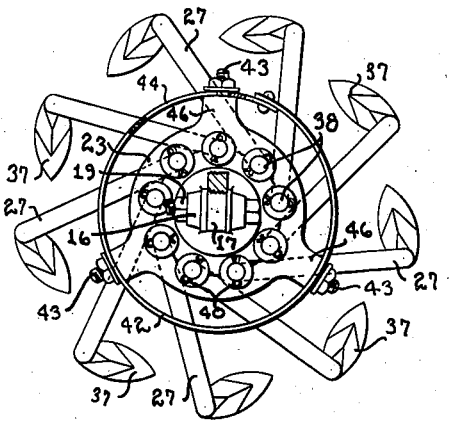
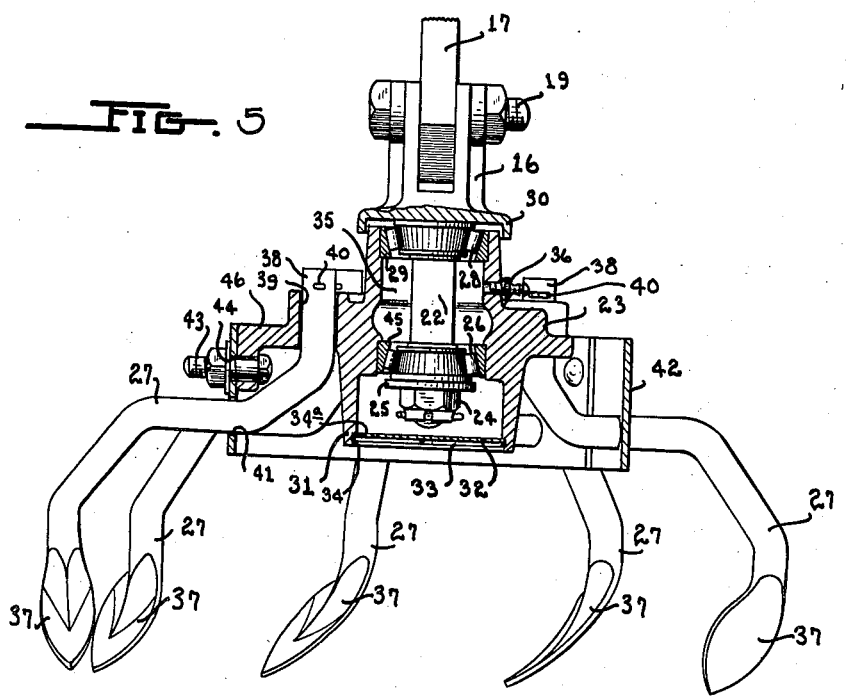
Inventors
CHARLES M. SIMMONS
ERNST E. ENGLUND
by Toulmin & Toulmin
Attorneys Patented Sept. 17, 1940

2,215,364

UNITED STATES PATENT OFFICE 2,215,364

ROTARY CULTIVATOR

Charles Martin Simmons, Memphis, Tenn., and Ernst E. Englund, Bellevue, Ohio, assignors to The Ohio Cultivator Company, Bellevue, Ohio, a corporation of Ohio Application June 9, 1939, Serial No. 278,195

9 Claims. (Cl. 97—6)

This invention relates to a cultivator and more particularly to a cultivator wherein the cultivating units which are drawn on both sides of the row of plants to be cultivated, are rotary in their action and are disposed at a slight angle to the horizontal whereby the lowermost teeth cause rotation of the blade carrying assembly with consequent stirring up of the earth.

The principal object of this invention is to provide a cultivator comprising a pair of freely floating independently suspended rotary blade carrying units for each row of plants to be cultivated. While the invention will be described with particular reference to a single row cultivator adapted to cultivate on both sides of the row next to the row, it will be understood that by duplication of the pair of rotary units, the device may be modified so as to cultivate any desired number of rows.

Another object is to provide means for tilting the freely floating rotary units at an angle with respect to the horizontal, the units being inclinable either towards or away from the row of plants being cultivated.

Yet another object is to provide a device of the foregoing type wherein each rotary unit comprises a load-supporting bearing and a thrust-receiving bearing. The load-supporting bearing carries the weight of the unit and the thrust-receiving bearing is adapted to take up any upward thrust imposed by the unit in operation. Both of these bearings further function to guide the unit in its rotary movement.

Another object is to provide a cultivator of the foregoing type wherein each unit comprises a plurality of circularly disposed teeth and means for quickly and easily adjusting the diameter of the circle formed by these teeth.

Another object is to provide adjusting means for the cultivator unit, wherein the teeth are formed at the outer ends of arms, the inner ends of which are pivoted in a circular hub or collar surrounding the supporting axle and wherein a circular yoke surrounds these arms intermediate their ends, this circular yoke being angularly adjustable so as to adjust the distance of the teeth from the center of the unit.

Another object is to provide means for adjusting the rotary units towards and away from each other so as to adapt the cultivator to varying requirements.

Another object is to more thoroughly pulverize the soil and destroy the weeds and grass; by their revolving action, the teeth cultivate or stir up all of the earth in their path and leave no ridges as do the ordinary cultivator shovels.

Another object is to provide a device which can be adjusted either to throw the soil up to the plant or to leave the ground level or to throw the dirt away from the plant, by tilting the rotary units so that one side of the teeth will dig deeper than the other.

Another object is to provide a cultivator which will cultivate hard or compact ground without turning up large lumps so as to cover the small plants; in the normal operation of the device, the front teeth cut the hard earth, turning away from the row of plants and the rear teeth rework the earth and pulverize the large lumps, these rear teeth turning towards the row of plants and leaving a very finely comminuted path.

Referring to the accompanying drawings:

Figure 1 is a rear elevation of an assembled cultivator embodying the principles of the present invention.

Figure 2 is a perspective of the left-hand rotary cultivator unit shown in Figure 1.

Figure 3 is a plan view of the cultivator unit of Figure 2 showing it in that position of adjustment wherein the blades are wide open, that is, in a position where the teeth are disposed on a circle of maximum diameter. In this view, the adjusting band is shown in section along a portion including one of the three adjusting slots.

Figure 4 is a view similar to Figure 3 but showing the blades in their position of extreme contraction.

Figure 5 is a vertical section of the rotary cultivator unit of Figures 2 to 4.

Figure 6 is a detailed plan view of the unit-carrying assembly.

The cultivator of the present invention is universal and may be adapted to fit all types of cultivators, horse-drawn, tractor drawn, walking, riding, etc., although it is described herein with particular reference to a horse-drawn walking cultivator.

Referring to the drawings in detail, Figure 1 shows a horse-drawn, straddle-row, walking cultivator having the usual wheels 1, tongue 2, and frame or arch 3. Frame 3 is formed in the usual manner with an inverted U-shaped central portion to make room for relatively high plants. This U-shaped portion is rigidly attached to the tongue 2 in the usual manner and its lower portion is provided with the usual integral outwardly extending wheel-supporting axle members 3a. Fixedly attached to tongue 2 in any desired manner, is a transversely extending supporting arm 4 which extends downwardly. The ends of this arm 4 are provided with holes 5 which are adapted to receive supporting springs 6 which support the cultivator units. These springs 6 are attached at their opposite ends to yokes 7 which extend upwardly from the vertically-swinging unit-carrying beams 50. These beams 50 extend rearwardly from and are pivoted about the wheel supporting axle members 3a of frame 3.

At the rear end of the pivoted, longitudinal unit-supporting beams 50, transverse members 8 are fixedly attached thereto. These members 8 are provided on their upper side with fixedly attached cone shaped members 9 which are adapted to engage similar cone shaped members 10 to which the guiding and controlling handles 11 are attached. Conical members 9 and 10 are locked with respect to each other by any suitable means as, for example, a bolt passing therethrough. These handles 11 are adapted to be angularly adjusted relative to the cultivator itself by reason of the serrations 12 provided in the engaging faces of cone members 9 and 10. As shown in Figure 1, these handles extend leftwardly so that the operator can walk in the track of left wheel 1 and can guide the cultivator and the action of the cultivator units from this position.

Transverse members 8 are adapted to be adjusted in their horizontal inclination with respect to the cultivator generally. This is accomplished by holes 13 and 14 provided in the inward ends of transverse beam 8, a rod 15, which is fixedly attached to axle member 3a, being insertable in holes 13 when it is desired to have the rotary units inclined as shown in Figure 1 and being insertable in holes 14 when it is desired to have the rotary units oppositely inclined to throw dirt away from the row. In order to secure this action, beams 8 are pivotally supported in their middle relative to the longitudinal supporting beams 50.

As a result of the construction thus far described, the rotary cultivating units are each independently suspended from the machine and are freely floating individually relative to the machine. The springs 6 yieldingly support them in a vertical plane parallel to the longitudinal axis of the cultivator. These springs 6 allow the units to freely float up and down so that the action of one of the units does not interfere with the action of the other unit.

The units themselves are provided at their upper end with a bifurcated coupling member 16 which receives one end of a longitudinal member 17, the other end of which is received in one of a pair of holes 18 provided in beam 8. Member 17 is rigidly locked to coupling member 16 by means of bolt 19. Member 17 is fixedly held in hole 18 in beam 8 at the desired position of longitudinal adjustment by any suitable means. In Figure 1, the members 17 are shown as received in inward holes 18. Where it is desired to space the rotary units further apart, members 17 are inserted in outward holes 18.

For each row of plants to be cultivated, a right hand unit 21 and a left hand unit 20 is provided. The right hand unit 21 is identical with the left hand unit 20 except that it is a mirror embodiment thereof. The rotary unit comprises the stationary coupling member 16 which is provided with an integral downwardly extending shaft 22 upon which is supported the rotatable teeth-carrying hub or casting 23. The lower end of shaft 22 is provided with castellated nut 24, washer 25, and tapered bearing 26, upon which rests a tapered bearing race 45 which takes up any upward thrust on shaft 22 during operation and the weight of hub 23 when the units are raised out of operative position.

Disposed about the upper end of shaft 22 is a similar tapered roller bearing 28 which cooperates with tapered bearing race 29 to receive any upward thrust exerted upon arms 27 or any downward thrust imposed on shaft 22 during operation. Tapered roller bearings 26 and 28 also function as radial bearings to guide the unit in its rotation about shaft 22. As shown, these bearings are inclined in opposite directions in order to attain the desired results.

Bifurcated member 16 is provided with an annular shield 30 which extends downwardly about the upper portion of hub 23 and which prevents access of dirt to the bearings in hub 23 by way of the top thereof. In order to prevent dirt from entering the bearings in hub 23 by way of the bottom thereof, the lower portion of hub 23 is formed as a downwardly extending annular rim 31 which is provided interiorly with a circular plate 32 held in place by a wire bail 33 which cooperates with a recess 34 in annular rim 31 to hold plate 32 against an annular shoulder 34a formed on the inner face of hub 23.

In order to provide for lubrication of the rotary unit, hub 23 is formed with a large hollow chamber 35 between the two bearings 26 and 28 which is adapted to receive grease supplied to an "Alemite" fitting 36. The grease from chamber 35 is adapted to be carried upwardly to bearing 28 and downwardly to bearing 26.

The arms 27 have earth-engaging teeth 37 and extend therefrom inwardly towards shaft 22. On unit 20, teeth 37 project from arms 27 is a counter-clockwise direction, while on unit 21 they project in a clockwise direction. Arms 27 are formed at their inward end with a vertically disposed portion 38 which is received pivotally in a hole 39 formed in hub 23. A hole 39 is provided for each of the arms 27 and these holes 39 are disposed in a circle in the hub 23. Arms 27 are held against vertical displacement by reason of a cotter pin 40 passing therethrough above hub 23, and by reason of their being bent outwardly just below hole 39.

Intermediate their ends, arms 27 pass through elongated holes 41 formed in a circular yoke 42. This yoke 42 is fixedly but adjustably supported on projecting lugs 46 formed integral with casting 23 by means of bolts 43 which pass through three slots 44 in yoke 42 into lugs 46. These slots extend peripherally an equal distance, and adjustment of the diameter of circle formed by teeth 37 is obtained by loosening bolts 43 and rotating yoke 42 with respect to casting 23. In this way, the angle at which arms 27 is disposed is varied and thereby the outward positioning of teeth 37 is adjusted. In Figures 3 and 4, the yoke 42 is shown in section along one of the three adjusting slots 44. Figure 3 shows the bolts 43 lying against one end of slots 44, the teeth being adjusted to the extreme outward position and the arms 27 being radially disposed. Figure 4 shows the bolts 43 lying against the other end of slots 44, the teeth being adjusted to the extreme inward position, the arms 27 being disposed so that their axes lie well outwardly of the center of shaft 22.

The cultivator units 20 and 21 revolve on their vertical axes as the cultivator moves forward. As shown in Figure 1, this is accomplished by so inclining the units 20 and 21 that the outside teeth 37 penetrate deeper in the ground than the teeth working next to the row of plants. Thus, the teeth next to the row of plants are driven at double the forward speed of the cultivator because the units are pivoted on the momentarily stationary outside teeth, and because their central axes are moved forwardly at the speed of the cultivator. As a result, the forward teeth break up the earth into relatively large chunks and move these large chunks away from the row of plants, while the rear teeth comminute these chunks of earth and distribute the finely divided earth towards the row of plants. In this way, the teeth of the device run shallow next to the plant and do not disturb the small feeding roots which run out horizontally from the plant. When adjusted in this way, the attachment does not leave trash, weeds, etc., up next to the row of plants, and leaves the soil smooth so as to hold the moisture. The adjustment of the diameter of the circle formed by teeth 37 enables the operator to vary the distance at which the unit cultivates from the row of plants.

If desired, the device may be adjusted so as to tilt the units at an angle opposite to that shown in Figure 1. In such a case, it will be preferable to interchange the units, using the unit 21 on the left-hand side and the unit 20 on the right-hand side.

For transporting the cultivator, a downwardly extending V-shaped member 48 is supported by the tongue 2 and is provided with hooks 47. Cooperating hooks 49 are provided on the beams 50 so that the rotary units may be lifted out of engagement with the ground by engaging hooks 49 with hooks 47.

It will be seen from the foregoing that the cultivator of the present invention constitutes a marked advance in the art of cultivating. An important feature is that of having the rotary units independently freely floating with respect to the cultivator itself. Thus displacement of one of the units in encountering an obstruction, such as an abnormally compact section of earth or a stone, does not cause the other unit to be displaced and does not interfere with its cultivating action. In addition, the rotating units of this invention are self-cleaning which is a marked advantage.

It will be understood that in applying the invention to different uses, numerous modifications may be made therein without departing from the inventive spirit. For example, in making the units for use on a tractor cultivator, the shank 17 is usually made as a round post while in the walking cultivator described herein, it is shown as a flat shank. Likewise numerous uses and adjustments of the device described herein may be effected. For example, the device may be adjusted to fit a ridge formed in the earth along the row of plants, to cultivate level ground, to throw dirt to or from the row, or to leave the surface level. These results may be attained by interchanging the rotary units and their angles of inclination, or by merely adjusting their angle of inclination or, in some cases, by merely sliding the adjusting band 42 in the direction desired. Thus, when the teeth 37 are adjusted so that the axes of arms 27 are rearward of the central axis of the unit and so that teeth 37 point inwardly as shown in Figure 4, they throw dirt onto the row. When they are adjusted so that the axes of arms 27 intersect the central axis of the unit as shown in Figure 3, they tend to throw dirt away from the row. Slots 44 may be made longer if desired so that the central axes of arms 27 may be adjusted so as to be forward of the central axis of the unit and so that teeth 37 may point outwardly to accentuate this tendency. Instead of having only two positions of angular adjustment of the units relative to beams 8, as shown, the device may be provided with angular adjusting means of any suitable type providing for any position of angular adjustment. Similarly, the device may be equipped with means providing any position of lateral adjustment of the units relative to beams 8, instead of only the two positions shown. These and other variations in adjustment and in construction may be utilized without departing from the inventive thought.

Having thus fully described our invention, what we claim as new and desire to secure by Letters Patent is:

1. In a cultivator, a pair of independently suspended freely floating teeth-carrying rotary cultivator units which are spaced apart from one another so as to allow a row of plants to pass therebetween, said units being oppositely horizontally inclined in such manner that the outside teeth penetrate more deeply into the ground than the teeth which are adjacent the row of plants, and each of said units having circularly disposed teeth directed forwardly in the direction of rotation of the unit.

2. In a cultivator, a support, a pair of teeth-carrying rotary cultivator units carried thereby, said units being oppositely horizontally inclined in such manner that the outside teeth penetrate more deeply into the ground than the teeth which are adjacent the row of plants, and each of said units having circularly disposed teeth directed forwardly in the direction of rotation of the unit, and independent yielding supporting means interposed between said support and each of said rotary units for independently supporting each of said rotary units so as to be individually freely floating.

3. A rotary cultivator unit comprising a plurality of circularly disposed teeth carried on a rotatable hub, and means for adjusting the diameter of the circle of said teeth.

4. A rotary cultivator unit comprising a plurality of circularly disposed teeth carried on arms pivoted at their inner end to a rotatable hub, and an angularly adjustable yoke engaging said arms intermediate their length, whereby the diameter of the circle of said teeth may be adjusted by adjusting said yoke angularly.

5. In a cultivator, a pair of independently suspended freely floating teeth-carrying rotary cultivator units which are spaced apart from one another so as to allow a row of plants to pass therebetween and which are angularly inclined with respect to one another so that their teeth which are adjacent the row will be propelled forwardly at a speed greater than that at which said units are moved forwardly, the teeth on each of said units being circularly disposed and directed forwardly in the direction of rotation of the unit.

6. In a cultivator, a support, a pair of teeth-carrying rotary cultivator units carried thereby, said units being oppositely horizontally inclined in such manner that the outside teeth penetrate more deeply into the ground than the teeth which are adjacent the row of plants, and each of said units having circularly disposed teeth directed forwardly in the direction of rotation of the unit and an independent spring interposed between said support and each of said rotary units for independently supporting each of said rotary units so as to be individually freely floating.

7. In a cultivator, a support, a pair of rotary cultivator units carried thereby, each of said units comprising a plurality of circularly disposed teeth carried on a rotatable hub and means for adjusting the diameter of the circle of said teeth, said units being oppositely horizontally inclined, and independent means disposed between said support and each of said units for yieldingly supporting them so that they are individually freely floating in a vertical plane.

8. In a cultivator, a support, a pair of rotary cultivator units carried thereby, each of said units comprising a plurality of circularly disposed teeth carried on arms pivoted at their inner end to a rotatable hub and an angularly adjustable yoke engaging said arms intermediate their length, said units being oppositely horizontally inclined, and means interposed between said support and each of said units for yieldingly supporting them so that they are individually freely floating in a vertical plane.

9. A rotary cultivator unit comprising a stationary vertical shaft, a rotatable hub surrounding said shaft, arms pivotally engaging said hub at their inward ends, teeth carried at the outer ends of said arms and extending at right angles to said arms, and means for adjusting the distance of said teeth from said hub and the angular positioning of said arms comprising a yoke engaging said arms intermediate their ends, said yoke being angularly adjustably mounted on said hub.

CHARLES MARTIN SIMMONS.
ERNST E. ENGLUND.